US008001189B2

(12) United States Patent
Nielsen et al.

(10) Patent No.: US 8,001,189 B2
(45) Date of Patent: Aug. 16, 2011

(54) ROUTING OF NETWORK MESSAGES

(75) Inventors: Henrik F. Nielsen, Seattle, WA (US);
John P. Shewchuk, Redmond, WA (US);
Erik B. Christensen, Seattle, WA (US);
Alfred M. Lee, Seattle, WA (US);
Christian Huitema, Clyde Hill, WA (US); James M. Lyon, Redmond, WA (US); Mark H. Lukovsky, Sammamish, WA (US); Andrew J. Layman, Bellevue, WA (US); Satish R. Thatte, Redmond, WA (US); Christopher Kaler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2415 days.

(21) Appl. No.: 10/270,445

(22) Filed: Oct. 15, 2002

(65) Prior Publication Data

US 2003/0074413 A1    Apr. 17, 2003

Related U.S. Application Data

(60) Provisional application No. 60/329,796, filed on Oct. 16, 2001, provisional application No. 60/346,370, filed on Oct. 19, 2001, provisional application No. 60/371,155, filed on Apr. 10, 2002.

(51) Int. Cl.
*G06F 15/16* (2006.01)
(52) U.S. Cl. ....................................................... 709/206
(58) Field of Classification Search ................... 709/206, 709/207, 238
See application file for complete search history.

(56) References Cited

U.S. PATENT DOCUMENTS

| 5,771,355 | A | * | 6/1998 | Kuzma | 709/232 |
| 5,778,189 | A | * | 7/1998 | Kimura et al. | 709/236 |
| 5,845,086 | A | * | 12/1998 | Doebrich et al. | 709/238 |
| 6,044,395 | A | * | 3/2000 | Costales et al. | 709/206 |
| 6,189,028 | B1 | * | 2/2001 | Bucher | 709/207 |
| 6,587,437 | B1 | * | 7/2003 | Lee et al. | 370/236.1 |
| 6,973,035 | B2 | * | 12/2005 | Seddigh et al. | 370/235 |
| 7,010,572 | B1 | * | 3/2006 | Benjamin et al. | 709/206 |
| 7,054,948 | B2 | * | 5/2006 | Rhodes | 709/238 |
| 7,069,335 | B1 | * | 6/2006 | Layman et al. | 709/238 |

(Continued)

FOREIGN PATENT DOCUMENTS

GB    0118172 .6    * 7/2001

OTHER PUBLICATIONS

Nielsen et al. Web Services Routing Protocol (WS-Routing), 2001, Microsoft, pp. 1-25.*

(Continued)

*Primary Examiner* — Wing Chan
*Assistant Examiner* — Alicia Baturay
(74) *Attorney, Agent, or Firm* — Shook, Hardy & Bacon L.L.P.

(57) ABSTRACT

A routing protocol is provided for exchanging messages between an initial sender and an ultimate receiver, potentially via a set of intermediaries. The routing protocol provides an optional reverse message path that enables two-way message exchange patterns. The routing protocol can be expressed as a header entry within a message envelope, is independent of the underlying protocol, and can be generated at the application layer of a protocol stack. The routing protocol may allow each intermediary to process the message and dynamically alter the message path en route to the intended recipient.

54 Claims, 12 Drawing Sheets

U.S. PATENT DOCUMENTS

| | | | | |
|---|---|---|---|---|
| 7,076,558 | B1* | 7/2006 | Dunn | 709/229 |
| 7,085,550 | B1* | 8/2006 | Echols et al. | 455/403 |
| 7,120,671 | B2* | 10/2006 | Gusler et al. | 709/206 |
| 7,124,299 | B2* | 10/2006 | Dick et al. | 713/178 |
| 2001/0042131 | A1* | 11/2001 | Mathon et al. | 709/238 |
| 2002/0019849 | A1* | 2/2002 | Tuvey et al. | 709/206 |
| 2002/0099776 | A1* | 7/2002 | Cafarella et al. | 709/206 |
| 2002/0170040 | A1* | 11/2002 | Idan | 717/141 |
| 2002/0174178 | A1* | 11/2002 | Stawikowski | 709/203 |
| 2002/0174218 | A1* | 11/2002 | Dick et al. | 709/224 |
| 2002/0174340 | A1* | 11/2002 | Dick et al. | 713/178 |
| 2003/0018808 | A1* | 1/2003 | Brouk et al. | 709/238 |
| 2003/0046426 | A1* | 3/2003 | Nguyen | 709/242 |
| 2003/0076825 | A1* | 4/2003 | Guruprasad | 370/389 |
| 2004/0174882 | A1* | 9/2004 | Willis | 370/395.5 |
| 2004/0194111 | A1* | 9/2004 | Marcey et al. | 719/310 |
| 2005/0010643 | A1* | 1/2005 | Fellenstein et al. | 709/206 |
| 2005/0021650 | A1* | 1/2005 | Gusler et al. | 709/207 |

OTHER PUBLICATIONS

"IP Routing Policies and Filters", printed from http://support.baynetworks.com/library/tpubs/html/switches/bstream/115401A/L_17.HTM on Sep. 26, 2002.

K. Swaminathan, "Negotiated Access Control", Proceedings of the 1985 Symposium on Security and Privacy: Apr. 22-24, 1985, pp. 190-196.

W. LeFabvre, "Permissions and Access Control Lists", Performance Computing, vol. 16, No. 11, Oct. 1998, pp. 59-61.

B. Dunkel et al., "Customized Metadata for Internet Information", 1997 First International Conference on Knowledge-Based Intelligent Electronic Systems: Proceedings, vol. 2, May 21-23, 1997, pp. 508-516.

U. Srinvasan et al., "Managing Heterogeneous Information Systems through Discovery and Retrieval of Generic Concepts", Journal of the American Society for Information Science, vol. 51, No. 8, Jun. 2000, pp. 707-723.

J. Martinez et al., "MPEG-7 The Generic Multimedia Content Description Standard, Part 1", vol. 9, No. 2, Apr.-Jun. 2002, pp. 78-87.

C. Süβ et al., "Meta-modeling for Web-Based Teachware Management", Advances in Conceptual Modeling: ER'99 Workshops on Evolution and Change in Data Management, Reverse Engineering in Information Systems, and the World Wide Web and Conceptual Modeling, 1999, pp. 360-373.

K. Lang et al., "XML, metadata and efficient knowledge discovery", Knowledge-Based Systems, vol. 13, No. 5, Oct. 2000, pp. 321-331.

T. Baker, "A Multilingual Registry for Dublin Core Elements and Qualifiers", ZfBB 47, 2000, pp. 14-19.

J. Moy, OSPF Version 2, Networking Working Group, RFC 2328, Ascend Communications, Inc., Apr. 1998, pp. 1-204.

J. Moy, OSPF Version 2, Networking Working Group, RFC 1247, Proteon, Inc., Jul. 1991, pp. 1-177.

* cited by examiner

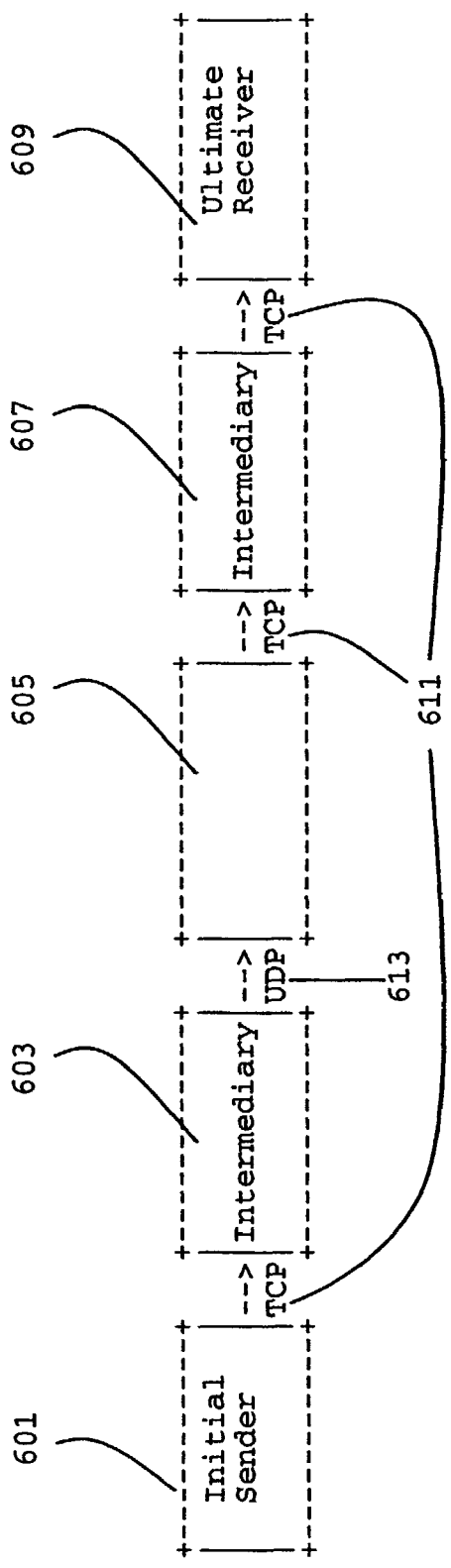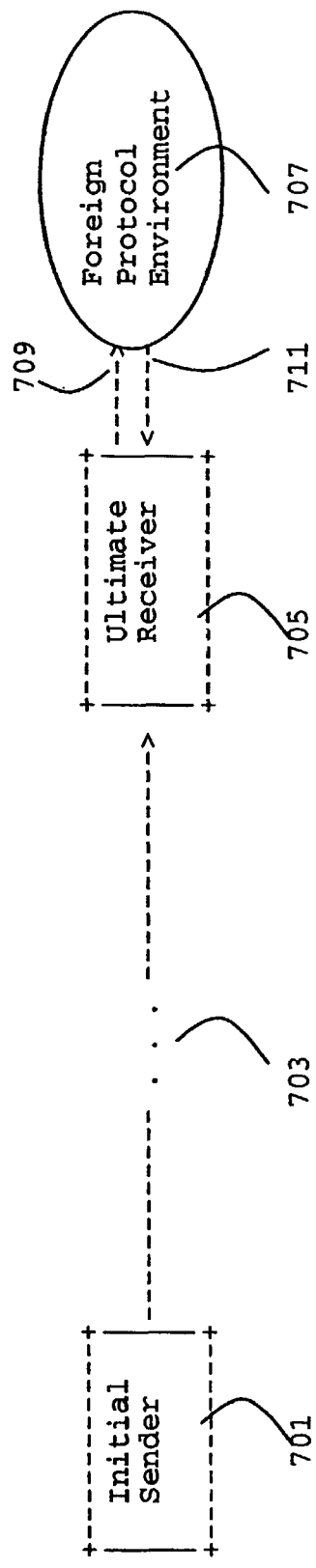

```
<envelope>
  <header>
    <path>
      <to>ultimate_receiver_407</to>         807
      <fwd>
        <via>intermediary_403</via>          803
        <via>intermediary_405</via>
      </fwd>
      <from>initial_sender_401</from>        811
      <action>action_URI</action>
      <id>some_unique_identifier</id>
      <relatesTo>some_other_unique_identifier</relatesTo>
    </path>
  </header>
  <body>
    . . .
  </body>
</envelope>
```

```
<path>
    <to>ultimate_receiver_1007</to>
    <fwd>
        <via>intermediary_1003</via>
        <via>intermediary_1005</via>
    </fwd>
    <from>initial_sender_1001</from>
    <action>action_URI</action>
    <id>some_unique_identifier</id>
    <rev>
        <via/>
    </rev>
</path>
```

Fig. 12

```
<path>
    <to>ultimate_receiver_1007</to>
    <fwd>
        <via>intermediary_1005</via>  } 1203
    </fwd>
    <from>initial_sender_1001</from>
    <action>action_URI</action>
    <id>some_unique_identifier</id>
    <rev>
        <via/>    1207
    </rev>
</path>
```
1201
1205

Fig. 13

```
<path>
    <action>message_fault_notify</action>
    <fwd>
        <via/>
    </fwd>
    <rev>
    </rev>
    <from>another_sender</from>
    <id>some_new_unique_identifier</id>
    <relatesTo>some_unique_identifier</relatesTo>  } 1307
    <fault>
        <code>sender_fault</code>                  } 1311
        <reason>receiver_not_found</reason>
    </fault>
</path>
```
1309

Fig. 14A

```
<path>
<via>A</via>
<via>B</via>
<via>C</via>
<via>D</via>
<via>E</via>
</path>
```

Fig. 14B

```
<path>
    <via>A</via>
    <via>B</via>
    <encryptedVia>
        <keyFor="B">B_Key</key>
        <data>C
            <encryptedVia>
                <keyFor="C">C_Key</key>
                <data>D
                    <encryptedVia>
                        <keyFor="D">D_Key</key>
                        <data>E</data>
                    </encryptedVia>
                </data>
            </encryptedVia>
        </data>
    </encryptedVia>
</path>
```

```
<path>
    <via>A</via>
    <via>B</via>
    <encryptedVia>
1407    <keyFor="B">B_Key</key>
        <data>C'</data>
    </encryptedVia>
</path>
```

Fig. 14D

```
<path>
    <via>A</via>
    <via>B</via>
    <via>C</via>
    <encryptedVia>
1409    <keyFor="C">C_Key</key>
        <data>D'</data>
    </encryptedVia>
</path>
```

Fig. 15

```
<Path>
  <Via>A</Via>
  <Via>B</Via>
  <EncryptedVia>
    <Key For="B">B_Key</Key>      } 1505
    <Data>C</Data>
  </EncryptedVia>
  <EncryptedVia>
    <Key For="C">C_Key</Key>      } 1507
    <Data>D</Data>
  </EncryptedVia>
  <EncryptedVia>
    <Key For="B">B_Key</Key>
    <Key For="D">D_Key</Key>      } 1509
    <Data>E</Data>
  </EncryptedVia>
</Path>
```

1501

ROUTING OF NETWORK MESSAGES

This application claims priority to provisional U.S. Application Ser. Nos. 60/329,796 filed Oct. 16, 2001, 60/346,370 filed Oct. 19, 2001, and 60/371,155 filed on Apr. 10, 2002.

FIELD OF THE INVENTION

The invention relates to the field of computer networking. More specifically, the invention relates to specifying a message path for a message in a computer network.

BACKGROUND OF THE INVENTION

Currently, much of the utility of computer systems lies in their ability to communicate and share information with other computer systems. Information is typically passed between computer systems via computer networks. Computer networks are groups of computers interconnected by wires or wireless mechanisms such as infrared, radio, and other technologies. The Internet is a global network of many smaller computer networks connected to one another. There is no controlling central network, but rather several high level networks that are connected through network access points. A network access point is a computer hardware or software device (commonly a network router) that serves as a kind of translator between two different networks.

In the early days of computing, there were many different types of computers running many different types of operating systems and software. Early computer network developers realized the necessity for providing a predefined way for these various computers to talk to and understand one another. From this realization came the development of network protocols. Network protocols define the format and the order of messages exchanged between two or more computers, as well as the actions taken by each on the transmission or receipt of a message or other event, in order for two or more networked computers to communicate.

The process of internetworking various computers can be complicated. In order for data to pass from one computer to another, the various network components need to be able to understand numerous applications and protocols along with an assortment of differing end systems and connection types. In order to reduce the design complexity, network developers have organized network protocols, along with the hardware and software that implement the protocols, into network layers. Each protocol belongs to one of these layers. Each layer performs a small, well-defined set of duties. A protocol suite, alternatively called a protocol stack, is a set of these layers usually found on machines connected to the Internet. Common examples include the Open System Interconnection (OSI) seven-layer protocol stack and the Transmission Control Protocol/Internet Protocol (TCP/IP) stack, which consists of four or five layers depending upon implementation.

A protocol stack is organized in such a way that the highest level of abstraction is at the top layer. For example, the top layer may process Hypertext Markup Language (HTML) web pages or Extensible Markup Language (XML) at a client computer, while the bottom layer deals with transmission electronic signals at a binary level. Each layer in the stack builds upon the services provided by the layer below it. The services of a layer refers to the set of the functions that the particular layer offers to the layer immediately above it. The term service differs from the term protocol in that a protocol defines the exchange that takes place between similar layers of two hosts, whereas services are provided from a lower layer in the stack to a layer above it.

When data is sent over a network it is sent in the form of a data packet. Each layer of the protocol stack appends a header containing layer-specific information to the data packet. The process of appending data with headers is called encapsulation. When a data packet is sent, it is encapsulated by the various layers of the protocol stack. When the encapsulated data packet is received at its destination, it goes through the process of decapsulation. During decapsulation the layers of the receiving stack extract layer-specific information and process the encapsulated data accordingly.

Systems connected to the Internet use the TCP/IP protocol stack. At the bottom of the protocol stack is the physical layer. The physical layer typically deals with communicating binary data by manipulating electrical voltages. Just above the physical layer is the data link layer. The data link layer provides low level services such as error detection, framing, error correction, flow control, and the like. Together these two layers are responsible for moving raw data across a physical (or wireless) medium from one device to an immediately adjacent device.

Above the physical layer and data link layer is the network layer. In the TCP/IP protocol stack, the Internet Protocol (IP) resides at the network layer. IP is often described as the common thread that holds the Internet together. The network layer may also have routing protocols that determine the routes that data packets take between source and destination. In sum, the network layer is responsible for moving data from one host to another.

Sitting on top of the network layer is the transport layer. The transport layer extends the network layer's delivery service between two hosts by providing connection between two programs (or processes) running on the hosts. In the TCP/IP protocol stack, there are two transport layer protocols that provide service to the application layer protocols: TCP and User Datagram Protocol (UDP). TCP is a connection-oriented service, meaning that a connection is made between the source and destination in order to ensure the reliable transmission of data. UDP is a connectionless service, which does not take any measure to ensure delivery of data, but rather makes a "best effort" to see that it is delivered. The transport layer receives messages or data packets from the application layer. The application layer, which sits above the transport layer, is responsible for supporting network applications. Many different protocols are included in the application layer. For example, the application layer may include Hypertext Transfer Protocol (HTTP) to support web traffic, Simple Mail Transfer Protocol (SMTP) for e-mail, and File Transfer Protocol (FTP) for file transfer. The application layer is the layer that is most visible to the end user of a system.

Viewing the five layers of the TCP/IP stack as a whole, the sharing of data between hosts over the network is briefly summarized as follows: The application layer creates and handles the actual data that a sender wishes to send to a receiver. The transport layer establishes a connection between sender and receiver and ensures that once the data sent over the application layer reaches the receiver, it is given to the correct process or application running on the receiver. The network layer makes the decision of how the data is going to travel across the network to get from the sender to the receiver. More specifically, the network layer makes the actual routing decisions. The physical layer and data link layer manage the way that the physical bits, bytes and voltages move across the media on the route chosen by the network layer.

In known messaging systems, routing decisions are generally made at the network layer. A message is sent by the application layer, which is encapsulated by the transport layer and handed off to the network layer. A software or hardware component in the network layer receives the encapsulated data from the transport layer, and sends it on to the receiver. Each message traverses the network through a series of "hops" from network router to network router. Typically, routers found along the route make what is called a "next hop" decision. That is, they only choose the next router to forward the message to, leaving that next router to make the next routing decision. Network engineers have attempted to overcome this limitation by implementing a technology known as source routing. Source routing is a routing technique that causes some or all intermediate routing points to be represented directly in the data packet to be forwarded. This is in contrast to the typical situation in which intermediate routers rely on acquired routing state information to forward incoming packets. Although source routing has been used to specify a route to take in delivering a message, source routing determines the path at the network level. Using source routing, it is not possible for an application to specify a route that includes intermediate stops between the sender and the ultimate destination, for example, to take advantage of value-added services at a specified intermediate location. Source routing, moreover, carries significant security risks in many contexts, and is not generally used for routing common network traffic. Thus, it would be an advancement in the art to provide a system that allows applications to choose their own message paths without using source routing. It would be a further advancement in the art to allow a network application to make intelligent decisions about routing by defining its own message path, and also to provide a mechanism for a dynamic message path that can change over the course of the transmission of a message.

In the context of application protocols, it may be desirable to utilize distributed services. Distributed services are those services that are distributed across the network on multiple servers to accommodate large numbers of users. Often times, utilizing distributed services creates a need for an application to be able to determine how to send a message between services. It would be an advancement in the art to provide an improved method for an application to determine how to send a message between distributed services.

Known messaging systems also lack the ability to allow a sender to specify, along the path from ultimate sender to ultimate receiver, one or more intermediaries at which the message may be further processed. As a message is transported through a network in a series of router hops, routers typically ignore the encapsulated application layer data, focusing only on the IP addressing information (stored in the network layer header) necessary to process the message and send it to its next hop. It would thus be an advancement in the art for an intermediary host to be able to not only process the network information in the IP header, but also see and process the entire message, perhaps adding services, additional routing instructions, or even additional data to the message, before sending it to the next hop. It would be a further advancement in the art to be able to dynamically define a return message path based on the network route traveled by a network message.

BRIEF SUMMARY OF THE INVENTION

The problems and limitations of the prior art described above are overcome by providing a routing protocol that allows application-layer programs to specify a message path including one or more intermediaries at which the message may be substantively processed. After an intermediary processes the message, the intermediary forwards the message to either the next intermediary (when present) or the message recipient.

According to an aspect of the invention, a reverse message path may be dynamically created during the message's forward traversal of the message path. Related messages or fault messages may then be returned to the initial sender using the dynamically created reverse message path.

According to other aspects of the invention, various data structures may be used to store message path routing information, including the sender, the recipient, and the list of one or more intermediaries. The data structure may be modified in transit to include the dynamically created reverse message path, and to remove intermediaries through which the message has already passed.

BRIEF DESCRIPTION OF THE DRAWINGS

FIG. 6 shows a message path with two different underlying protocols.

FIG. 7 shows an exemplary routing gateway according to aspects of the present invention.

FIG. 12 shows a pseudo-code implementation of a forward message path and an optional reverse message path populated by empty reverse VIAs.

FIG. 13 shows a pseudo-code implementation of a message path that includes a message fault.

FIG. 14A shows a pseudo-code implementation of a non-encrypted message path according to an illustrative embodiment of the present invention.

FIG. 14B shows a pseudo-code implementation of an encrypted message path according to another illustrative embodiment of the present invention.

FIG. 14C shows a second pseudo-code implementation of an encrypted message path according to another illustrative embodiment of the present invention.

FIG. 14D shows a pseudo-code representation of a partially decrypted message path according to an aspect of the present invention.

FIG. 15 shows a pseudo-code representation of an encrypted message path according to an aspect of the present invention.

DETAILED DESCRIPTION OF THE INVENTION

According to one or more aspects of the invention, a routing protocol is used to define a message header entry that describes a stateless, one-way forward message path along with an optional reverse message path. The message header entry may be a SOAP message header entry, or a header entry for any other extensible protocol such as, for example, Java Remote Method Protocol (JRMP). This message path is defined in terms of senders, receivers, and intermediaries. This routing protocol allows a user or application to dynamically define a message path between senders, receivers, and intermediaries, and provides a way to describe which parts of each message (if any) are intended for the receiver and one or more intermediaries along the defined path.

A sender generates a message and binds the message to an underlying protocol for the purpose of transferring the message. The message may be bound to TCP, UDP, or some other transport protocol that is known in the art. Although the message need not be bound to an application layer protocol in order to describe the message path, it may in some embodiments be bound to application layer protocols such as HTTP, SMTP or other application layer protocols as are known in the art.

A receiver refers to a device that accepts an incoming message transferred using some underlying protocol for the purpose of processing the message. An initial sender refers to a sender that originates a message as the starting point of a message path. An ultimate receiver refers to the receiver that the initial sender specifies as the intended destination of the message it sends along the message path. However, the actual final destination may in some cases differ from the intended destination as a result of the message path being exchanged. A message path refers to the route that a message takes in traveling from an initial sender to an ultimate receiver and can be defined by the routing protocol.

An intermediary refers to a device that is neither the initial sender nor ultimate receiver, and acts as both a sender and a receiver for the purpose of processing and forwarding a received message along a defined message path on behalf of either the initial sender or the ultimate receiver. The message path comprises the set of senders and receivers that process a single message when it is created and sent.

Figure 1:
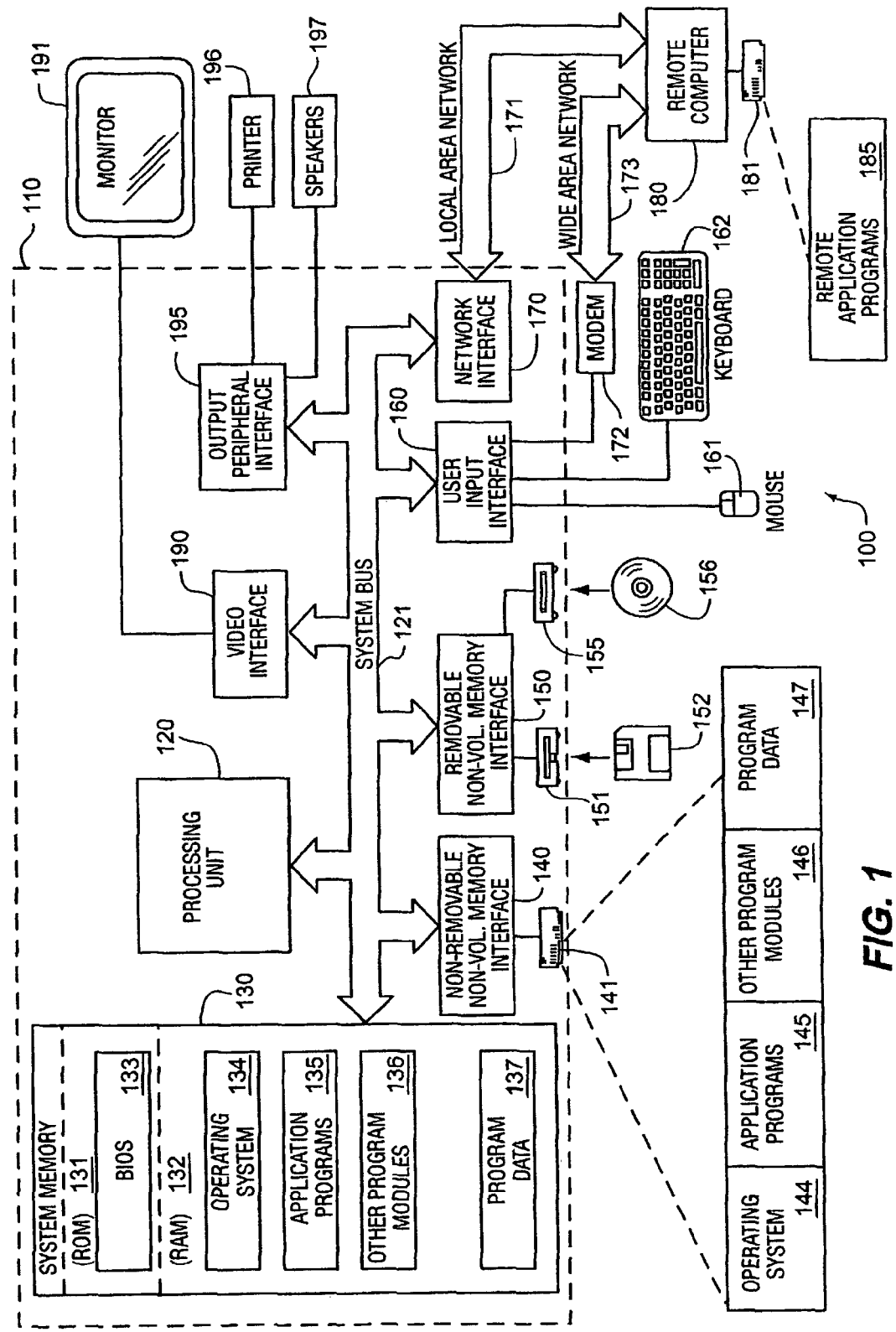
FIG. 1 illustrates a computing system environment on which one or more aspects of the invention may be implemented.

FIG. 1 illustrates an example of a suitable computing system environment 100 on which the one or more aspects of invention may be implemented, e.g., as a sender, receiver, and/or intermediary. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figures 2A, 2B, 2C:
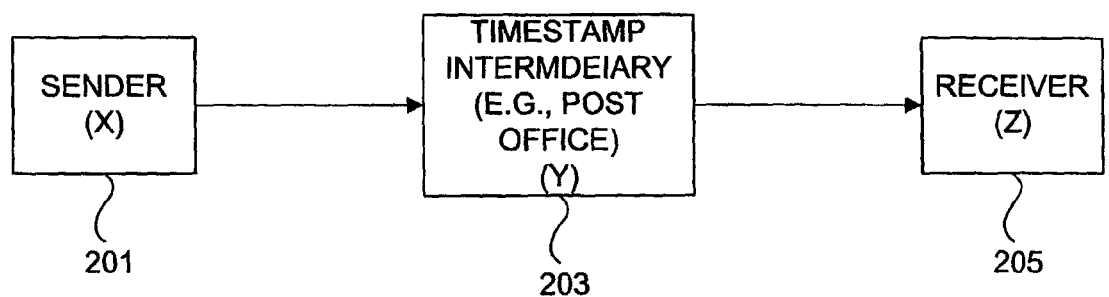
FIG. 2 shows an example of how an intermediary may provide a value-added service to a message.

Using the routing principles described herein, an application can specify a message path, for example, to ensure that the message is routed through an intermediary that provides a value added service. With reference to FIG. 2, an initial message 207, is initiated for any reason by some application (e.g. a web services client application on a user's computer) and sent from initial sender 201 to ultimate receiver 205. In order for the ultimate receiver 205 to process initial message 207, a timestamp may be required from timestamp intermediary 203 in order to verify when the message was sent. The timestamp intermediary 203 (e.g., a post office) processes the message and adds a timestamp to the message. Value-added message 209 is then sent from timestamp intermediary 203 to ultimate receiver 205.

Figure 3:
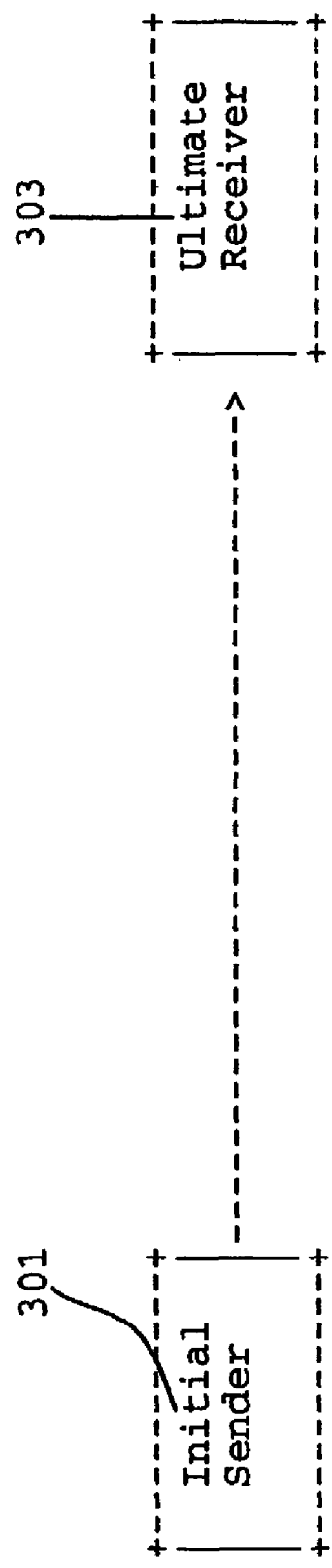
FIG. 3 shows a message path from an initial sender to an ultimate receiver without any intermediaries.

Referring to FIG. 3, a message is initiated for any reason defined by some application that is able to route messages using a routing protocol of the present invention. This application is the initial sender 301. The initial sender 301 indicates the ultimate receiver 303, which is another application that is able to receive messages according to the routing protocol of the present invention. The ultimate receiver 303 may also be the final destination of the message sent by the initial sender 301.

Figure 4:
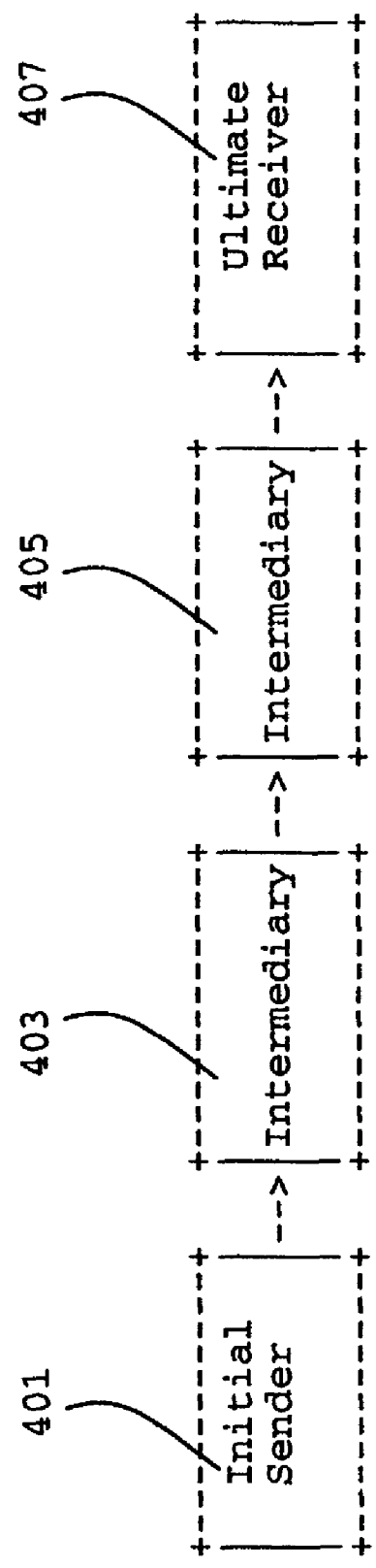
FIG. 4 shows a message path with two intermediaries.

Referring to FIG. 4, an initial sender 401 may also define a set of zero or more routing intermediaries 403, 405 through which the message must pass on its way to the ultimate receiver 407. These routing intermediaries may dynamically insert additional routing information, e.g., one or more additional intermediaries, in the message path as shown in FIG. 3. These routing intermediaries may be any SOAP router, a network application on a computer or some other network-enabled application or system as known in the art.

Figure 5:
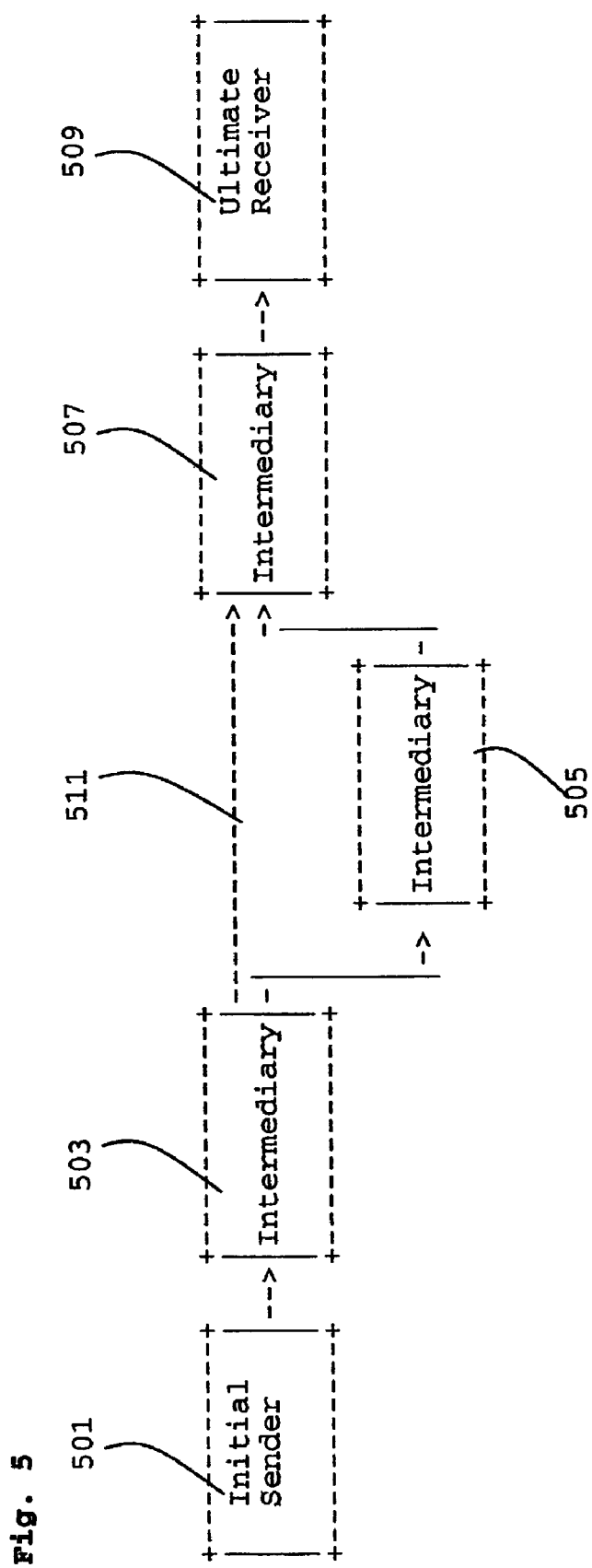
FIG. 5 shows a message path with two intermediaries in which one of the intermediaries inserts an additional intermediary into the message path.

In FIG. 5, an initial sender 501 defines a message path to an ultimate receiver 509 via intermediaries 503 and 507. Intermediary 503 may, as provided below, insert intermediary 505 into the message path, e.g., to obtain some value-added service provided by intermediary 505. The initial message path between intermediary 505 and intermediary 507 is depicted by line 511. Inserted intermediary 505 returns the message to the initial message path by sending it to intermediary 507, which forwards the message to ultimate receiver 509. Thus, the initial sender might not know or define the entire message path. The initial sender can only provide an ultimate destination for the message, even if the initial sender knows that the ultimate receiver is not the final destination of the message.

In other aspects of the present invention, routing intermediaries are provided that allow applications enabled to use the routing protocol described herein to access services that the sender may have subscribed to, or is otherwise using. In some embodiments, these services may be annotation services, collaboration services, subscription management services, privacy enforcement services, caching services, or other services known in the art. Routing intermediaries may also facilitate the traversal of application-level intermediaries such as firewalls, network address translators (NATs), proxy services, or other devices such as packet filters that are put in place for administrative or policy purposes.

Each intermediary may insert additional intermediaries in the message path without renegotiating the message path with the previous routing sender. The insertion of intermediaries into the message path may be governed by a set of rules, or policies, which limit the circumstances in which new intermediaries may be inserted into the message path. For example, a policy might be set that an intermediary should not insert additional intermediaries into a message path unless it has administrative reasons, or permissions, for doing so or is using a service provided by those intermediaries. Another policy may be set that prohibits the introduction of infinite routing loops when adding intermediaries to the message path. Still another policy might be introduced that prohibits an intermediary from changing the ultimate receiver of the message.

In another aspect of the present invention, the intermediaries may use different underlying transport protocols for sending and receiving messages. Referring to FIG. 6, initial sender 601 sends a message destined for ultimate receiver 609 via routing intermediaries 603, 605, and 607. As the message leaves the initial sender, the message may be bound to a first transport protocol 611, in this example TCP. The message is received by routing intermediary 603 and processed therein. Routing intermediary 603 sends the message to routing intermediary 605 by binding the message to a second transport protocol 613, in this example UDP. Intermediary 605 receives the message, processes the message, binds the message to first transport protocol 611 (TCP), and sends it to intermediary 607. Intermediary 607 receives the message, processes the message, and sends it over TCP connection 611 to ultimate receiver 609. In this example, none of the intermediaries change the ultimate destination of the message.

Another aspect of the invention includes a routing gateway. A routing gateway is a routing receiver that can act as a gateway into a foreign protocol environment. Unlike the routing intermediaries that use different underlying protocol bindings on the sending and receiving side (described above), a routing gateway changes the ultimate destination and the format of the message. With reference to FIG. 7, an initial sender 701 sends a message to an ultimate receiver 705 with the message path defined according to the routing protocol of the present invention. The message may pass through a series of intermediaries 703 or it may go directly to the ultimate receiver 705. The ultimate receiver acts as a routing gateway into foreign protocol environment 707. The ultimate receiver/routing gateway 705 performs a semantic mapping of the routing header in the message into some other protocol that may be unknown to the routing protocol of the present invention. If, for example, telnet were unknown to the routing protocol of the present invention, the routing gateway would translate the message into a telnet message and pass it into the telnet environment along a redefined message path 709, in which the destination value for the message has been modified from ultimate receiver 705 to some address in the foreign protocol environment 707. The foreign protocol environment 707 may be, for example, a legacy mainframe computer that uses some legacy data format or protocol. The ultimate receiver 705 may also serve as a gateway from the foreign protocol environment 707 into a route defined by the protocol of the present invention via a path 711.

In yet another aspect of the invention, an optional reverse message path is defined that enables two-way message exchange patterns such as request/response, peer-to-peer conversations, return message acknowledgements and non-acknowledgements, or some other two-way message exchange known in the art. The reverse message path is optional in the sense that it need not be created, and further that it need not be used even if it is created by entities along the forward message path. The reverse path can be used to indicate a possible message path for a message to be sent to the initial sender for which the reverse path was built. That is, the reverse message path becomes a possible forward path that allows a recipient of a message to send another message back to the initial sender without having to create a channel or virtual connection between them, and also allows the recipient to indicate that the message being sent back to the initial sender corresponds to the original "forward" message. The reverse message path may be governed by substantially the same rules as the forward path, and may be built dynamically as a message travels along a forward message path.

Figures 8, 9:
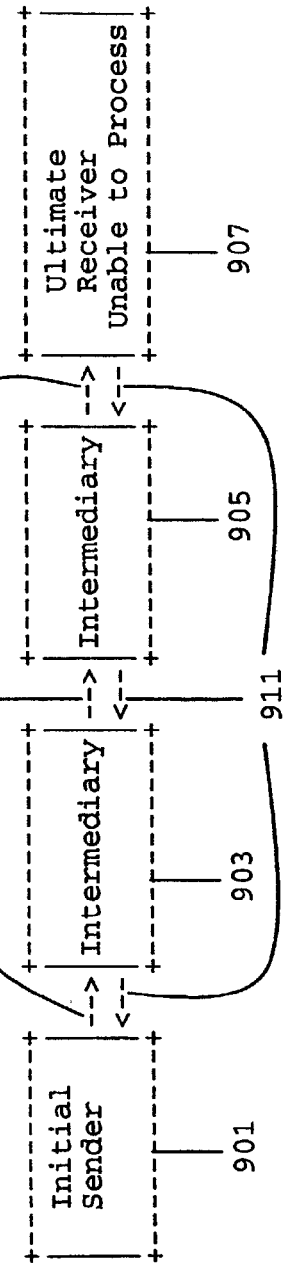
FIG. 8 shows a pseudo-code implementation of a forward message path according to an illustrative embodiment of the present invention.
FIG. 9 shows a message path that has both a forward message path and an optional reverse message path.

In an exemplary embodiment, the reverse message path can be used to transmit fault messages from the ultimate receiver back to the initial sender on the message path. Referring to FIG. 9, initial sender 901 sends a message on a forward message path 909 to ultimate receiver 907 according to the protocol of the present invention. The forward message path 909 includes intermediaries 903 and 905. As the message traverses the forward message path, a reverse message path 911 is built. When the message reaches the ultimate receiver, if it is unable to process the message for some reason, the ultimate receiver 907 then generates a fault message and sends it along the reverse message path 911 back to the initial sender 901.

Figures 10, 11:
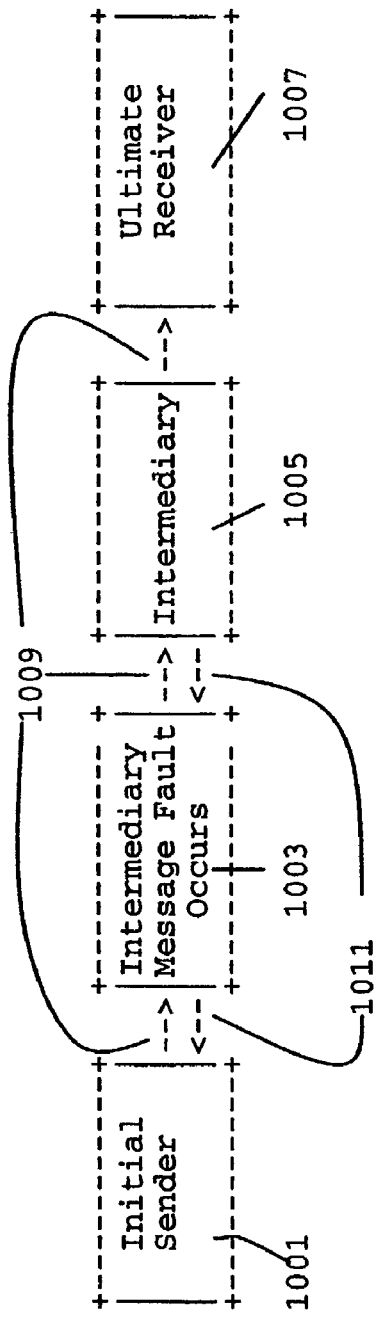
FIG. 10 shows an exemplary partially constructed reverse message path according to the present invention.
FIG. 11 shows a pseudo-code implementation of a forward message path and an optional reverse message path according to an illustrative embodiment of the present invention.

Because an optional reverse message path may be built dynamically as the message flows along the forward message path, if an error occurs while a message is in transit (i.e., prior to receipt by the ultimate receiver), an intermediary on the forward message path can immediately generate a fault message or some other message and send it along the reverse message path to the initial sender. Referring to FIG. 10, initial sender 1001 sends a message on a forward message path 1009 to ultimate receiver 1007. The forward message path 1009 may include one or more intermediaries, e.g., intermediaries 1003 and 1005. As the message traverses the forward message path, assume intermediary 1005 encounters a problem that generates a message fault. For example, the intermediary 1005 might have been unable to process the message, or possibly the ultimate receiver 1009 was unavailable for receiving the message. A reverse message path 1011 has been generated dynamically by intermediaries 1003 and 1005, so a fault message or some other type of message as is known in the art can be sent back to initial sender by intermediary 1005 along the reverse message path 1011.

As noted previously, the routing protocol of the present invention may be bound to some underlying transport protocol or application protocol. The underlying protocol may provide a bi-directional communication channel or a unidirectional communication channel. TCP, for example provides a bi-directional communication channel, while UDP, for example provides a unidirectional communication channel. In the case of a bi-directional communication channel, the reverse message path is defined as an implicit reverse message path, and may be transferred over the same channel as the forward message path. It the case of a unidirectional communication channel, the reverse message path can be explicitly specified independently of the underlying unidirectional protocol. Typically the reverse message path will end at the initial sender specified in the forward message path. A reverse path may, in some cases, not be necessary where the underlying protocol is bi-directional. Nevertheless, a reverse path may be specified even if bound to a bi-directional underlying protocol. For example, in a case of a message that will receive a reply three days later, it would be inefficient to leave the channel open for that duration. Thus, a reverse path is created in some instances even when the underlying protocol is bi-directional. In other situations, the initial sender may contain one or more rules (policies) that indicate a different endpoint for the reverse message path. In such a situation, the reverse message path may be explicitly specified. In another embodiment, the reverse message path may switch between protocol bindings in the same way as shown with the forward message path in FIG. 6. Such a switch between protocol bindings may be done for optimization purposes or any other purpose.

In implementing the routing protocol disclosed herein, a system or syntax may define certain elements in order to indicate senders, receivers and intermediaries on a message path. The terms used herein to define these elements are descriptive in nature and are not intended to be limiting as to their form or syntax. FIG. 8 provides an example of pseudo-code representing a message sent using an embodiment of the present invention. A message sent using the routing protocol of the present invention may have a TO element 807 and a FROM element 811. A TO element identifies the ultimate routing receiver. In one embodiment, the ultimate routing receiver will be identified by a uniform resource identifier (URI). A URI is a formatted string that identifies a resource on the Web. The URI may include a name, a location, or some other identifying characteristic. In other embodiments, other address indicators as known in the art, such as MAC addresses, e-mail addresses, or URLs may be used. The FROM element 811 may be used to identify the entity or human responsible for the message. The FROM element 811 may be in the form of a URI, more specifically in the form of a mailto: URI. The initial sender sets the TO element 807. There is no requirement that a TO element have a request/response message exchange pattern as is found in the HTTP Request-URI. The TO element is not typically modified by routing intermediaries, although in certain circumstances, such as the implementation of a routing gateway, for example, the TO element may be modified by an intermediary.

The message path from initial sender to ultimate receiver can be defined under the routing protocol of the present invention in terms of a forward element (FWD) 801. FWD element 801 indicates that the message is a forward message. The FWD element 801 may contain an ordered list of VIA elements 803. Each VIA element 803 describes an intermediary through which the message is requested by the sender to pass when traversing the network from initial sender to ultimate receiver. Referring to FIG. 8, pseudo-code is provided to demonstrate a possible implementation of the routing protocol as shown in FIG. 4 which demonstrates the a message leaving an initial sender 401 to ultimate receiver 407 via intermediaries 403 and 405. The FWD element 801 shows two VIA elements, indicating that the message should be routed to intermediary 403 and then intermediary 405 prior to delivery to ultimate receiver 407. A VIA element may contain a value or it may be empty. If the VIA element contains a value, the value represents the explicit endpoint of some routing receiver that is to receive the message at a given point in the message path. If the VIA element 803 contains no value, an implicit endpoint is provided by an underlying protocol binding. This situation typically arises as a result of a previous message having built a reverse message path using that underlying protocol binding. For example, when a message is bound to a protocol that opens a bi-directional session (e.g., TCP), the session may provide the reverse VIA destination. That is, the SOAP router reads the top reverse VIA, which is empty, and thus knows to obtain the next hop destination by sending the message to the next node from which it originally came in the forward direction. VIA elements 803 may be inserted by any routing sender on the message path. An intermediary may insert a VID attribute on the topmost VIA element of the reverse path of the message if that VIA element is empty. The VID attribute enables an intermediary to identify the bi-directional channel to the previous sender without maintaining per message state and without requiring a one-to-one correspondence between the bi-directional channel to the previous routing sender and the next routing receiver in the message path. This VID element allows an intermediary to separate the management of bi-directional channels to the previous routing sender and next routing receiver in the message path. The VID attribute may be a unique URI that can be used to correlate between the bi-directional communication channel indicated by the empty VIA element and messages using the reverse path.

In yet another embodiment, the message path consists entirely of VIA elements 803. Instead of having a FROM element 811, the first VIA element is contains the initial sender information. Instead of having a TO element 807, the last VIA contains the ultimate receiver information. Those of skill in the art will appreciate that other syntactic variations may be used to achieve the same result.

Each message can be sent in a message envelope 817 containing a header 807 and a body 813 that carries the message payload. The message path 805 that is defined according to the routing protocol of the present invention may be stored in the message header 807. The message may also have an ID element 809 to uniquely identify the message. The ID element can be created by the initial sender using Universally Unique Identifiers (UUIDs), cryptographic hash algorithms, or some other virtually unique identification technique as is commonly known in the art.

A message sent using the routing protocol of the present invention may have an element that is used to indicate that a relationship exists between two messages e.g., the RELATESTO element 815. The RELATESTO element need not indicate how two messages are related, but rather simply indicate that a relationship between the two messages exists. RELATESTO elements may be used, for example, to indicate a relationship between a faulty message and a subsequent message fault. Although the RELATESTO element need not indicate how two messages are related, it can describe the relationship between two messages, if so desired. For example, a relationship type such as "reply of" or "fault from" may be provided for a RELATESTO element indicating the nature of the relationship between the two messages. In addition, a relationship type called "response" may be provided that differs from "reply of" in that there may be multiple responses to a message, but only one reply.

Referring to FIG. 11, a pseudo-code implementation of a message leaving the initial sender 1001 going to the first stop on the message path depicted in FIG. 8 is shown. The forward message path has two VIA elements 1103 that indicate the forward message passes through intermediary 1003 and intermediary 1005. The reverse message path is indicated by an element 1105 (e.g., REV) that encapsulates a reverse VIA element 1107. The reverse VIA element is empty, indicating that the reverse message path is defined as an implicit reverse message path. Intermediary 1003 will receive the message and process the message.

Referring now to FIG. 12, a pseudo-code implementation scheme for the forward and reverse message path for a non-faulty message leaving intermediary 1003 toward intermediary 1005 is shown. FWD element 1201 now has only one VIA element inside of it, VIA 1203 which points to intermediary 1005. The REV element 1205 that holds the optional reverse message path 1011 has been further built to include a second reverse VIA element 1207. In FIG. 10, intermediary 1005 generates some message fault.

FIG. 13 depicts pseudo-code that may be used to describe a fault message to send along the reverse message path back to initial sender 1001. A new forward message path is generated that includes the reverse VIA that was formerly part of the previous reverse message path. A RELATESTO element 1307 is inserted to indicate that this fault message is related to the previous message. A FAULT element 1309 is provided to describe the fault in terms of a fault code and a reason 1311. The fault codes may be classified as either one of many sender faults or one of many receiver faults or some other classification of fault as known in the art. A sender fault may be likened to a client fault as is known in the art; a receiver fault may be likened to a server fault as known in the art.

A receiver, whether an ultimate receiver or an intermediary carrying out the function of receiving and forwarding a message, may generate a routing fault. Thus, a variety of fault messages may be defined, each indicating one of many problems that can occur along the message path. Regardless of the type of fault message, the fault may be described in a fault section, e.g., FAULT element 1309. In one embodiment, if a reverse message path has been defined, the routing fault may be automatically returned to the initial sender.

In another embodiment, where no reverse message path is defined, the routing fault message may be discarded. In order to prevent an infinite "fault loop," the fault scheme may have one or more rules (policies) indicating that a routing fault should not be created in response to another routing fault. A routing fault may be carried in the header of the message, while a corresponding fault message may be carried in the body of the message. For example, the body of the message may carry a text message that appears on a user's screen indicating that a fault has occurred.

The routing protocol of the present invention may have a number of predefined fault messages. Although many are specified herein, the below list is in no way limiting. Any message fault may have a predefined fault message.

A sender fault may be described wherein the sender sent what appears to be a faulty header that cannot be fulfilled because of insufficient or unacceptable information. Unless explicitly stated, no information is given to whether the fault situation is permanent or temporary.

An invalid header fault may be defined in which the header is either malformed or incomplete. No further information is given about what caused the fault. The message might not be retried without modifications.

A header required fault may be defined wherein a header entry was not present in the message and is therefore not compliant with the routing protocol of the present invention. This fault code is appropriate if there is no header present at all within the message resulting in the fault. If there is a header present and it is malformed or incomplete then an invalid header fault code is appropriate.

An endpoint not found fault may be defined in which an endpoint in the message path was not found. The endpoint can either be an intermediary identified by a VIA element or it can be the ultimate receiver identified by the TO element.

An endpoint gone fault may be defined wherein an endpoint in the message path is known to not exist anymore and no alternative endpoint is known. This fault code is appropriate if the receiver knows that the endpoint once existed but has been permanently removed. The fault code is also appropriate if the implicit message path indicated by an empty VIA element is no longer available, for example, because the underlying communication channel has ceased to exist. The endpoint can either be an intermediary identified by a VIA element or it can be the ultimate receiver identified by the TO element.

An endpoint not supported fault may be defined wherein an endpoint in the message path is not supported by the receiver. This fault code is appropriate if the URI contains a URI scheme that the receiver does not support or if the URI points to a part of the URI space that the receiver does not service. The endpoint can either be an intermediary identified by a VIA element or it can be the ultimate receiver identified by the TO element.

An endpoint invalid fault may be defined such that an endpoint in the message path does not follow the allowed URI syntax. The endpoint can either be an intermediary identified by a VIA element or it can be the ultimate receiver identified by the TO element.

An alternative endpoint found error may be defined wherein one or more alternative endpoints were found for the requested service. This fault code may be appropriate if the receiver knows that the service is available using any of the alternative endpoints rather than the endpoint indicated in the received message. This may be analogous to an HTTP redirection or some other redirecting technique as known in the art. The endpoint for which alternative endpoints were found can either be an intermediary identified by a VIA element or it can be the ultimate receiver identified by the TO element.

An endpoint too long fault may be defined wherein the URI used to identify the endpoint is longer than the receiver can handle. This fault code is appropriate if the size of a URI identifying an endpoint in the header prevents the receiver from interpreting the message. Because of the problem in handling the size of the URI, the endpoint is not ordinarily included in any fault message generated for an endpoint too long error.

A message too large fault may be defined wherein the size of the overall message prevents the receiver from interpreting the message. There is no suggested size that a receiver must be able to handle as it may depend on the underlying protocol used.

A message timeout error may be defined where the sender did not complete the exchange of the message within the time that the receiver was prepared to wait. This may be dependent on the underlying protocol.

A message loop detected fault will be generated where a receiver has detected a message loop. Although the routing protocol of the present invention is designed to prevent message loops, a message fault for this occurrence is still provided.

A reverse path unavailable fault may be defined wherein a message with a reverse path was received by an intermediary but no reverse message path can be established between the intermediary and the next receiver. This fault code is appropriate if a reverse path is present in the message but the intermediary cannot forward the message in a manner that either explicitly or implicitly defines a reverse message path. More simply, this fault occurs where a message is able to continue along a message path, but cannot for some reason define a reverse path as it continues. Rather than forwarding the message, the intermediary may generate a fault to be returned to the initial sender via the reverse message path.

Receiver fault messages are generally created where the receiver failed to fulfill an apparently valid header because of a fault situation not directly attributable to the received message. For example, an unknown fault message may be defined wherein the receiver encountered an unexpected condition that prevented it from handling the received message.

An element not implemented fault message may be defined wherein the header used a defined element not supported by the receiver.

A service unavailable fault message may be defined wherein the receiver is unable to handle the incoming message due to known internal problems or maintenance of the receiver. An example of an internal problem can be a service internal to the receiver that is not responding. A service too busy fault may be defined wherein the receiver is too busy to handle the incoming message.

An endpoint not reachable fault may be defined wherein an endpoint in the message path is not reachable. This fault code is appropriate if the intermediary cannot determine a network route to the endpoint. The endpoint can either be an intermediary identified by a VIA element or it can be the ultimate receiver identified by the TO element.

Underlying Protocols

The routing protocol of the present invention provides bindings for TCP, UDP and HTTP as underlying protocols. Other protocol bindings are possible as well such as support for Java Remote Method Protocol (JRMP), Internet Inter-ORB Protocol (IIOP), and other transport and application layer protocols as are known in the art. The routing protocol of the present invention may also be used in conjunction with other underlying protocols available to SOAP.

A message sent according to the routing protocol of the present invention bound to either TCP or UDP may be encapsulated using an encapsulation format as known in the art. One such encapsulation format is Direct Internet Message Encapsulation (DIME) although other encapsulation formats as known in the art may alternatively be used.

Where HTTP is used as an underlying protocol, a mapping may be created between the Request-URI element of the HTTP message and the next receiver in the forward message path whether it is the ultimate receiver or an intermediary. This may be done by inserting a VIA element in the forward message path that contains an HTTP address as the next hop on the message path.

In some circumstances it may be desirable to encrypt routing information. Referring to FIG. 14A, a message may be routed from A to B to C to D to E using a series of VIAs placed in the forward message path.

In prior art systems, encrypting the message path was accomplished by nesting the encrypted routing information with the use of envelopes or by utilizing SSL if the privacy of the data traversing the message path was all that needed to be maintained. Nested encryptions are provided by encrypting individual elements in the message path. Also, while these nested encryptions are shown as keys, they may be implemented using decryption keys, a name, a hash, an index, a certificate or some other scheme known in the art. Referring to FIG. 14B, A may only have a key to decrypt routing information to B. B may only have a key to decrypt routing information to C. C may only have a key to decrypt routing information to D. D may only have a key to decrypt routing information to E. Referring now to FIG. 14C, pseudo-code is provided to demonstrate what point B sees as the message path under the nested implementation. Because B does not have a key to decrypt the data in encryptedVia 1409 and encryptedVia 1411, it only sees encryptedVia 1407 because it has the corresponding key. Once point B has decrypted and processed encryptedVia 1407, FIG. 14D shows what the pseudo-code representation of the message path may look like when received by point C', which comprises point C and encryptedVia 1409. Notice that point C' is no longer in an encryptedVia, but is rather in an unencrypted VIA. In the embodiment just described, VIAs are left in the message path so that each subsequent VIA element knows the path history. An alternative embodiment is also available in which previous VIA elements are removed from the message path after they are traversed. In such an implementation, each VIA has no knowledge of preceding VIA elements.

Because nesting does not provide for a case where, for example, A might need to know the key for D, in an additional aspect of the present invention, a method is provided for to optionally encrypting individual routing elements, potentially for multiple parties.

Referring to FIG. 15, an encrypted message path 1501 is shown in which the message traverses the network from A to B to C to D to E as shown in FIG. 14. Suppose the sender wishes points A and B to be unencrypted, but points C, D, and E to be encrypted. Suppose further that for some reason, for instance a security concern, the sender does not wish point A to know about point C, D, or E. The sender does want point B for to have knowledge of point E. Using traditional enveloping encryption techniques, the sender would not be able to accomplish what it desires. However, utilizing the routing protocol of the present invention, the sender it able to optionally encrypt individual routing elements, potentially for multiple parties. A key that allows B to view the data element (point C) of encryptedVia 1505 is placed inside of encryptedVia 1505. B thus is able to decrypt encryptedVia 1505 and send the message to point C. B is unable to decrypt encryptedVia 1507, because there is no key for B inside of it. B is, however, able to see that point E is in the message path because encryptedVia 1509 contains a key for both B and D.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for routing an electronic message from a sender to a receiver, comprising:
   generating, by an application-layer program executing on a computing device having a processor and a memory, an electronic message including a header portion and a data portion, said header portion comprising a requested, complete forward message path to be taken by the message from a sender to a receiver, the forward message path being specified by the application-layer program and including one or more application-layer intermediaries; and
   sending the message to a first application-layer intermediary of the forward message path for processing by the first application-layer intermediary and subsequent delivery to one of a second application-layer intermediary when present in the forward message path or to the receiver when no second application-layer intermediary is present in the forward message path, the message being sent to the first intermediary bound to a first underlying protocol and the subsequent delivery by the first intermediary employing a second underlying protocol that is different than the first protocol.

2. The method of claim 1, further comprising binding the message to an arbitrary transport protocol.

3. The method of claim 2, wherein the transport protocol comprises TCP.

4. The method of claim 2, wherein the transport protocol comprises UDP.

5. The method of claim 2, wherein the transport protocol comprises HTTP.

6. The method of claim 2, wherein the transport protocol comprises JRMP.

7. The method of claim 2, wherein the transport protocol comprises SMTP.

8. A method for routing an electronic message from a sender to a receiver, comprising:

generating, by an application-layer application executing on a computing device having a processor and a memory, an electronic message including a header portion and a data portion, said header portion comprising a forward message path to be taken by the message from a sender to a receiver, such that the forward message path in the header portion designates a complete list of one or more intermediaries via which the message is requested to travel from the sender to the receiver, the list of intermediaries being amendable by the one or more intermediaries as the message travels along the forward message path, and the forward message path being specified by the application-layer application; and sending the message to a first intermediary of the forward message path for processing by the first intermediary and subsequent delivery to one of a second intermediary when present or the receiver when no second intermediary is present in the forward message path of the header portion of the message, the message being sent to the first intermediary bound to a first underlying protocol and the subsequent delivery by the first intermediary employing a second underlying protocol that is different than the first protocol, wherein said generating the header portion further includes providing an indication for the intermediaries to dynamically build a reverse message path as the message traverses the forward message path in such a manner that, when the message is received at the receiver, the reverse message path designates a complete path from the receiver to the sender via the one or more intermediaries.

9. The method of claim 8, wherein the message comprises a SOAP message.

10. The method of claim 8, wherein the message comprises an XML message.

11. The method of claim 8, wherein the indication comprises an empty reverse message path.

12. In a network router that routes an application-layer program generated message having an ordered forward message path that is generated by the application-layer program and includes one or more application-layer intermediaries between a sender and a receiver, a computer implemented method for routing the message, the method comprising:

(a) receiving the message at a first application-layer intermediary corresponding to an application-layer intermediary at the beginning of the ordered forward message path generated by the application-layer program, the message being bound to a first underlying protocol;

(b) processing the message by the first application-layer intermediary, wherein processing includes removing the first application-layer intermediary from the beginning of the ordered forward message path;

(c) when the ordered forward message path is not empty, forwarding the message to a second application-layer intermediary corresponding to the beginning of the ordered forward message path subsequent to step (b); or (d) when the forward message path list is empty, forwarding the message to the receiver, wherein the ordered forward message path indicates a complete forward message path from the sender to the receiver, and wherein the ordered forward message path is amendable by the first and second application-layer intermediaries to insert or remove application-layer intermediaries from the ordered forward message path; and (e) adding the application-layer intermediary removed from the forward message path in step (b) to the beginning of a reverse message path that is dynamically generated by the one or more application-layer intermediaries as the message is processed thereby on the forward message path, the reverse message path including a complete ordered reverse message path from a current location of the message on the forward message path back to the application-layer program and sender, wherein in step (c) or (d) the message is sent bound to a second underlying protocol different from said first transport protocol.

13. The method of claim 12, further comprising the step of (f) inserting an additional application-layer intermediary into the ordered forward message path.

14. The method of claim 13, wherein step (f) inserts the additional application-layer intermediary at the beginning of the ordered forward message path.

15. The method of claim 12, wherein step (b) further includes providing a value-added service to the message.

16. The method of claim 15, wherein the value-added service comprises an annotation service.

17. The method of claim 15 wherein the value-added service comprises a collaboration service.

18. The method of claim 15, wherein the value-added service comprises a subscription management service.

19. The method of claim 15, wherein the value-added service comprises a privacy enforcement service.

20. The method of claim 15, wherein the value-added service comprises a caching service.

21. The method of claim 15, wherein the value-added service comprises an authentication service.

22. The method of claim 12, wherein step (b) further includes traversing one of a firewall, a NAT, or a proxy service.

23. The method of claim 12, wherein the first underlying protocol comprises TCP and the second underlying protocol comprises UDP.

24. The method of claim 12, wherein the first underlying protocol comprises UDP and the second underlying protocol comprises TCP.

25. The method of claim 12, wherein the first underlying protocol comprises TCP and the second underlying protocol comprises SMTP.

26. The method of claim 12, further comprising, prior to step (e), sending a fault message back to the sender via the reverse message path.

27. The method of claim 12, further comprising forwarding an acknowledgment message from the receiver back to the sender on the dynamically generated reverse message path.

28. A network router, comprising:

a processor;

a network interface for sending and receiving network messages; and memory storing computer readable instructions that, when executed by the processor, perform a method comprising:

a. receiving a message having an application-level generated message path stored in a header thereof, the message path comprising a sender, a receiver, and an ordered set of a plurality of application-layer intermediaries, wherein a first application-layer intermediary of the ordered set corresponds to the network router, the first application-layer intermediary being at any position in the ordered set of application-layer intermediaries, and the message being bound to a first underlying protocol;

b. removing the first application-layer intermediary from the ordered set of application-layer intermediaries; and c. when the ordered set is not empty, sending the message using a second underlying protocol to the next application-layer intermediary of the ordered set, otherwise, sending the message to the receiver, the second underlying protocol being different than the first underlying protocol.

29. The network router of claim 28, wherein the memory further comprises an application program that, when executed, modifies the message path within the message.

30. The network router of claim 29, wherein the application program modifies the message path by inserting a new application-layer intermediary into the ordered set of intermediaries.

31. The network router of claim 28, wherein the memory further comprises an application program that, when executed, performs a value-added service based on the message.

32. The network router of claim 31, wherein the value-added service comprises a post office service.

33. The network router of claim 31, wherein the value-added service comprises an authentication service.

34. The network router of claim 31, wherein the value-added service comprises an encryption service.

35. The network router of claim 31, wherein the value-added service comprises a collaboration service.

36. The network router of claim 31, wherein the value-added service comprises a caching service.

37. The network router of claim 31, wherein the value-added service comprises one of an annotation service, a proxy service, a NAT, or a firewall.

38. A network router, comprising:
a processor;
a network interface for sending and receiving network messages;
memory storing computer readable instructions that, when executed by the processor, perform a method comprising:
a. receiving a message having an application-level generated message path stored in a header thereof, the message path comprising a sender, a receiver, and an ordered set of a plurality of application-layer intermediaries, wherein the first application-layer intermediary of the ordered set corresponds to the network router, the first application-layer intermediary being at any position in the ordered set of application-layer intermediaries, and the message being bound to a first underlying protocol;
b. tracking the first application-layer intermediary from the ordered set of intermediaries; and
c. when the ordered set is not empty, sending the message using a second underlying protocol to the next application-layer intermediary of the ordered set, otherwise, sending the message to the receiver, the second underlying protocol being different than the first underlying protocol.

39. A computer readable storage device having stored thereon a data structure created by an application-layer program, comprising:
a first data field containing data representing a receiver of a message, the receiver including a processor for processing the data structure;
a second data field containing data representing a sender of the message;
a third data field containing data representing a forward message path through which the message is routed from the sender to the receiver, said forward message path defining a plurality of application-layer intermediaries through which the message must pass as the message is routed from the sender to the receiver, each of the one or more application-layer intermediaries including a processor for processing the data structure, at least one of the plurality of application-layer intermediaries receiving the message bound to a first underlying protocol and sending the message bound to a second underlying protocol, the second protocol being different than the first; and
a fourth data field containing data representing a reverse message path through which a return message associated with the message is routed to the sender, said reverse message path being dynamically generated by the application-layer intermediaries along the forward message path,
wherein said data structure causes the processors in the at least one of the receiver and the plurality of application-layer intermediaries to route the message according to the forward message path.

40. The computer readable storage device of claim 39, wherein the data structure further comprises a fifth data field encapsulated by the fourth data field, the fifth data field specifying an application-layer intermediary on the reverse message path.

41. The computer readable storage device of claim 40, wherein the fifth data field comprises a "VIA" element.

42. The computer readable storage device of claim 39, wherein the data structure further comprises a fifth data field containing data indicating that a relationship exists between the message and a second message.

43. The computer readable storage device of claim 42, wherein the fifth data field comprises a "RELATESTO" element.

44. The computer readable storage device of claim 39, wherein said first, second, third, and fourth data fields are stored in a header of the message.

45. The computer readable storage device of claim 39, wherein the first data field comprises a "TO" element, the second data field comprises a "FROM" element, and the third data field comprises a "FWD" element.

46. The computer readable storage device of claim 39, wherein the first data field comprises a "VIA" element, the second data field comprises a "VIA" element, and the third data field comprises a "VIA" element.

47. The computer readable storage device of claim 39, wherein the third data field comprises a "VIA" element.

48. The computer readable storage device of claim 39, wherein the fourth data field comprises a "REV" element.

49. A method for routing a network message, comprising an application-layer application generating a requested, complete ordered routing path from a sender to a receiver comprising at least one application-layer intermediary, and forwarding the message to the first application-layer intermediary in the ordered routing path, wherein forwarding the message to the first application-layer intermediary and any subsequent intermediaries or a receiver is governed by the routing path generated by the application-layer application and not a network-layer application, and wherein at least one of the at least one application-layer intermediaries receives the message bound to a first underlying protocol and sends the message bound to a second underlying protocol, the second protocol being different than the first.

50. In a forward message path governed by a set of rules from an initial sender to an ultimate receiver, a method for enabling two-way message exchange patterns comprising:
sending a message along the forward message path; and
dynamically building a reverse path governed by substantially the same set of rules as the forward message path and adding an indication of the reverse path to a header portion of the message, wherein the header portion of the message is generated by an application-layer program and describes a requested complete forward message path by designating a requested ordered group of intermediaries via which the message is to travel from the sender to the receiver, the ordered group of intermediaries being amendable by one or more of the intermediaries adding one or more additional intermediaries to the ordered group, wherein, at least one of the intermediaries receives the message bound to a first underlying protocol and sends the message bound to a second underlying protocol, the second protocol being different than the first, and wherein the reverse path is dynamically built by each of the intermediaries while the message traverses the forward message path in such a manner that, when the message is received by the ultimate receiver, the reverse path designates a path from the receiver to the sender via the intermediaries and the one or more additional intermediaries.

51. A method for specifying a two way message path, comprising:
   a. at an application layer, inserting at least one forward message path application-layer intermediary into a message envelope, the at least one application-layer intermediary receiving the message bound to a first underlying protocol and sending the message bound to a second underlying protocol, the second protocol being different than the first; and
   b. when requested by an initial sender, each of said at least one forward message path application-layer intermediary inserting a reverse message path application-layer intermediary into the message envelope before sending a message to a next application-layer intermediary or to an ultimate receiver of the message as indicated by a forward message path.

52. The method of claim 51, further comprising a specific application-layer intermediary inserting at least one additional application-layer intermediary into the message envelope.

53. One or more computer-readable storage devices having a data message header embodied thereon in which an application-layer application specifies a requested, complete route having a plurality of functional application-layer intermediaries prior to a final destination of the message, the data message header comprising:
   a. an identifier that indicates a purpose of a header comprises routing;
   b. an identifier identifying a final known destination;
   c. a plurality of first identifiers identifying an equal number of first application-layer intermediaries on a forward message path through which the message must travel between a sending node and the final destination, at least one application-layer intermediary receiving the message bound to a first underlying protocol and sending the message bound to a second underlying protocol, the second protocol being different than the first, and
   d. a plurality of second identifiers identifying an equal plurality of second application-layer intermediaries through which a return message associated with the message must travel on a reverse message path to the sending node, each of the plurality of second identifiers being provided by a respective one of the first application-layer intermediaries during transmission of the data message along the forward message path.

54. One or more computer-readable storage devices having computer-executable instructions embodied thereon that, when executed, perform a method for routing an electronic message from a sender to a receiver, the method comprising:
   generating by a sender comprising an application-layer application executing on a first computing device having a processor, an electronic message including a header portion and a data portion, said header portion comprising a complete forward message path to be taken by the message from the sender to a receiver, the forward message path including a plurality of application-layer intermediaries, the complete forward message path being alterable by one or more of the application-layer intermediaries during the transmission of the electronic message to include one or more additional application-layer intermediaries, and the complete forward message path including at least one of the plurality of application-layer intermediaries that receives the message bound to a first underlying protocol and sends the message bound to a second underlying protocol, the second protocol being different than the first; and
   sending the message to a first application-layer intermediary of the forward message path for processing by the first application-layer intermediary and subsequent delivery to a second application-layer intermediary, the header portion instructing the second application-layer intermediary to process and subsequently deliver the message to a third application-layer intermediary, when present, or to the receiver when no third application-layer intermediary is present,
   wherein processing by the first and second application-layer intermediaries includes providing substantive services including one or more of annotation services, collaboration services, subscription management services, privacy enforcement services, and caching services.

* * * * *